United States Patent [19]

Takeuchi et al.

[11] Patent Number: 5,134,392
[45] Date of Patent: Jul. 28, 1992

[54] KEYLESS ENTRY SYSTEM FOR LOCKING AND UNLOCKING A VEHICULAR LOCK DEVICE BY A POCKET PORTABLE RADIO SIGNAL TRANSMITTER AND ANTENNA ARRANGEMENT THEREFOR

[75] Inventors: Mikio Takeuchi; Kinichiro Nakano, both of Kanagawa, Japan

[73] Assignee: Nissan Motor Company, Limited, Yokohama, Japan

[21] Appl. No.: 200,900

[22] Filed: Jun. 1, 1988

[30] Foreign Application Priority Data

Jun. 16, 1987 [JP] Japan .................. 62-148044

[51] Int. Cl.$^5$ .............................................. G08C 17/00
[52] U.S. Cl. .................. 340/825.69; 340/825.31; 340/825.72; 343/712
[58] Field of Search .......... 340/825.31, 825.34, 340/825.69, 825.72, 825.54; 307/10 AT; 343/712, 713

[56] References Cited

U.S. PATENT DOCUMENTS

| | | | |
|---|---|---|---|
| 4,670,746 | 6/1987 | Taniguchi et al. | 340/825.31 |
| 4,688,036 | 8/1987 | Hirano et al. | 340/825.31 |
| 4,700,186 | 10/1987 | Fujino et al. | 340/825.72 |
| 4,719,460 | 1/1988 | Takeuchi et al. | 340/825.31 |
| 4,755,823 | 7/1988 | Ohe et al. | 343/712 |
| 4,760,394 | 7/1988 | Takeuchi et al. | 340/825.54 |
| 4,761,645 | 8/1988 | Mochida | 340/825.69 |

FOREIGN PATENT DOCUMENTS 3627193 2/1987 Fed. Rep. of Germany .

Primary Examiner—Donald J. Yusko
Assistant Examiner—Peter Weissman
Attorney, Agent, or Firm—Foley & Lardner

[57] ABSTRACT

A keyless entry system for operating a vehicular door lock device between a first door locking position and a second door unlocking position. The system has an electrically drivable actuator associated with the vehicular device for operating the latter between the first and second positions, a radio signal transmitter of a size equivalent to a credit-card, and being triggerrable by a trigger command and generating a radio code signal containing a preset identification code, the radio signal transmitter having a first antenna. The system also has a manually operable trigger switch mounted on a vehicle body and exposed to the outside of the vehicle body so that it is accessible from the outside of the vehicle, a controller connected to the actuator and the trigger switch and responsive to manual operation of the trigger switch to generate the trigger command, the controller receiving the radio code signal to compare the identification code with a preset authorized transmitter indicative code to output a control signal to the actuator for controlling the operation of the latter when the identification code matches the authorized transmitter indicative code. The keyless entry system employs an arrangement installing the second antenna within an internal space defined in a vehicular constructional body panel or door.

20 Claims, 6 Drawing Sheets

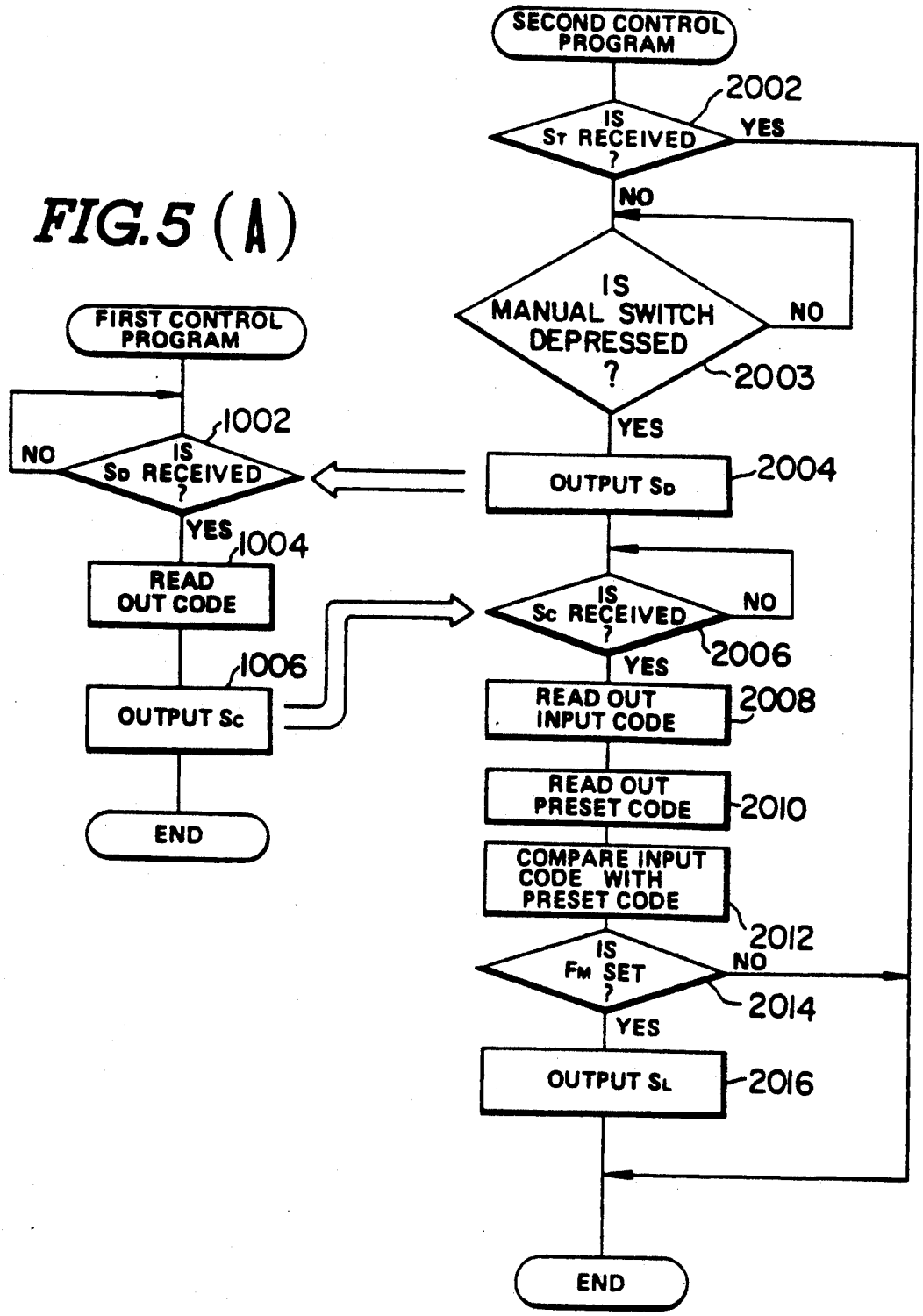

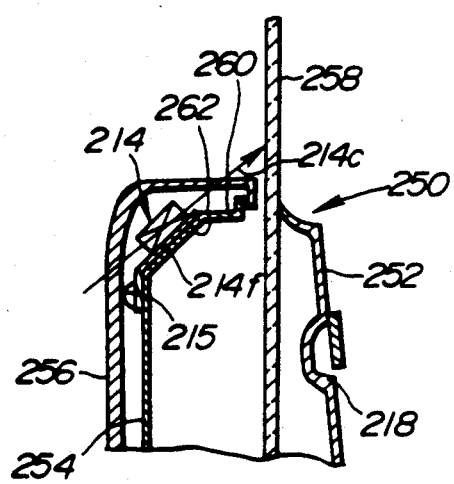
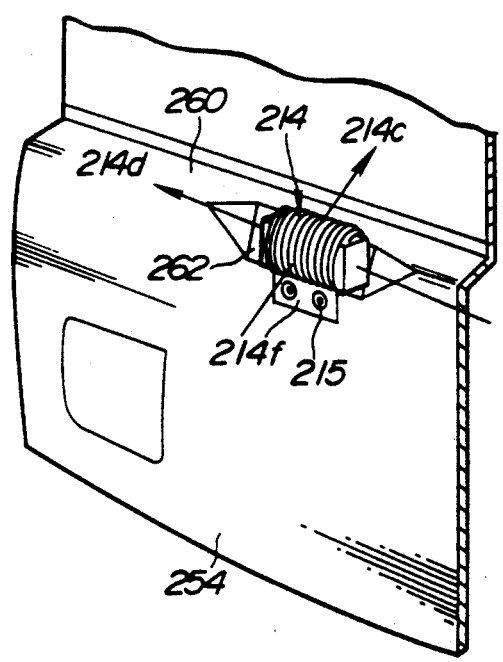
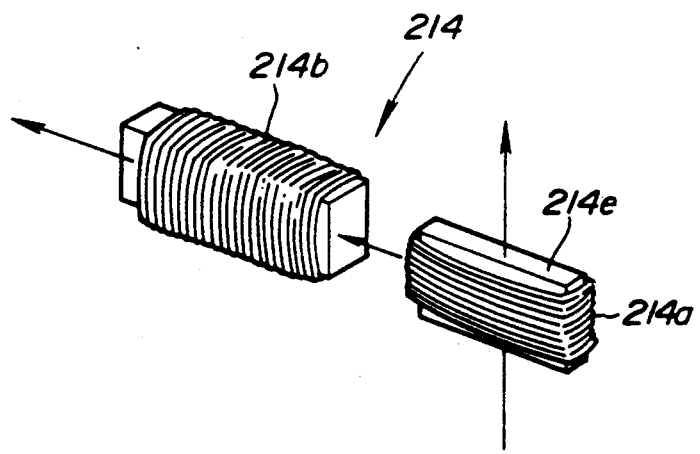

KEYLESS ENTRY SYSTEM FOR LOCKING AND UNLOCKING A VEHICULAR LOCK DEVICE BY A POCKET PORTABLE RADIO SIGNAL TRANSMITTER AND ANTENNA ARRANGEMENT THEREFOR

BACKGROUND OF THE INVENTION

1. Field of the Invention

The present invention relates generally to a keyless entry system for locking and unlocking a vehicular lock device, such as a vehicular door lock device, utilizing a pocket portable radio signal transmitter. More specifically, the invention relates to an antenna arrangement suitable for communication with the pocket portable radio signal transmitter and a vehicle mounted controller.

2. Description of the Background Art

Keyless entry systems which allow keyless or remote control operation for vehicular devices, such as a vehicular lock device, utilizing a credit- or bank-card like pocket portable radio signal transmitter, have been disclosed in the U.S. Pat. No. 4,719,460 issued on Jan. 12, 1988, to Mikio Takeuchi et al, commonly assigned to the assignee of the present invention. In such a keyless entry system, radio wave signals containing a transmission request command and an authorized transmitter identifying code, are transferred between the transmitter and a controller which is mounted on the vehicle via an antenna. In practice, radio signal transmission between a transmitter antenna and a vehicle mounted antenna is performed by electromagnetic induction.

In order to assure radio transmission, the U.S. Pat. No. 4,670,746, issued on Jun. 2, 1987, to Yoshiyuki Taniguchi et al, also assigned to the common assignee to the present invention, discloses a double loop antenna arrangement.

In such prior proposed antenna arrangements, the antennas are mounted outside of the vehicle body.

In the keyless entry system which has been practically implemented, a loop antenna is installed within a door mirror unit as disclosed in the co-pending U.S. patent application Ser. No. 895,371, filed on Aug. 11, 1986, which corresponds to German patent First publication No. 36 27 193. In this construction, in some situations the transmitter can be located at a relatively distant position from the manually operable command switch. When the distance between the transmitter and the door mirror mounted loop antenna is relatively wide, electromagnetic induction for transferring the signals cannot be assured.

On the other hand, aforementioned U.S. Pat. No. 4,670,746 proposes the antenna arrangement having a vehicle mounted antenna printed on a side window. The U.S. Pat. No. 4,670,746 further discloses a double loop layout of the antenna by arranging one antenna loop on the side window and another antenna loop on the door mirror. Such a double loop antenna is successful to assure transmission of a radio signal between the radio signal transmitter irrespective of the radio signal phase. On the other hand, this arrangement encounters a problem in that the antennas to be mounted on the side window and the door mirrors are to be prepared and installed separately from each other. Furthermore, the loop antenna mounted on the door mirror creates the same problem as that in the aforementioned U.S. Pat. No. 4,670,746.

SUMMARY OF THE INVENTION

Therefore, it is an object of the present invention to provide a keyless entry system which requires less power for radio signal transmission.

Another object of the invention is to provide an antenna arrangement suitable for radio signal transmission in a keyless entry system.

In order to accomplish the aforementioned and other objects, a keyless entry system, according to the present invention, employs an antenna arrangement installed within an internal space defined in a vehicular constructional body panel or door.

According to one aspect of the invention, a keyless entry system for operating a vehicular device between a first active position and a second inactive position comprises an electrically drivable actuator associated with the vehicular device for operating the latter between the first and second positions, a radio signal transmitter which is of a size equivalent to a credit-card for carrying in a cloth pocket, and being triggered by a trigger command and generating a radio code signal containing a preset identification code, the radio signal transmitter having a first antenna, a manually operable trigger switch mounted on a vehicle body and exposed to the outside of the vehicle body so that it is accessible from the outside of the vehicle, a controller connected to the actuator and the trigger switch and responsive to manual operation of the trigger switch to generate the trigger command, the controller receiving the radio code signal to compare the identification code with a preset authorized transmitter indicative code to output a control signal to the actuator for controlling the operation of the latter when the identification code matches the authorized transmitter indicative code, and a second antenna coupled with the controller and designed for transmitting the command signal to the transmitter and receiving the radio code signal therethrough, the second antenna including a first antenna loop forming a first magnetic field essentially parallel to a longitudinal axis of the vehicle and a second antenna loop forming a second magnetic field essentially transverse to the longitudinal axis of the vehicle, and the second antenna being installed within a space defined between an external surface and internal surface of the vehicle body construction in a location in the vicinity of the trigger switch.

In the practical construction, the first and second antennas are so designed as to establish radio communication by way of electromagnetic induction. Preferably, the second antenna is so located as to establish a magnetic field on the outside of the vehicle body substantially centered at the trigger switch position.

The vehicular device is a door lock device operable for establishing door locking at the first position and releasing door locking at the second position, and the trigger switch is installed in the vicinity of an outside door handle. In this case, the trigger switch may be mounted on an outside door handle escutcheon and the second antenna is installed between a door inner panel and a door trim.

In the preferred construction, a door inner panel is formed with an antenna receptacle recess to mount the second antenna thereon. The antenna receptacle recess is formed at a shoulder portion of the door inner panel, at which the door inner panel is bent.

In the alternative, the second antenna is installed between a center piller and a center piller garnish. The center piller garnish is formed with a second antenna receptacle recess on a surface opposing the center piller.

According to another aspect of the invention, in a keyless entry system for operating a vehicular door lock device between a first door locking position and a second door unlocking position comprising an electrically drivable actuator associated with the vehicular device for operating the latter between the first and second positions, a radio signal transmitter which is of a size equivalent to a credit-card for carrying in a cloth pocket, and being triggerred by a trigger command and generating a radio code signal containing a preset identification code, the radio signal transmitter having a first antenna, a manually operable trigger switch mounted on a vehicle body and exposed to the outside of the vehicle body so that it is accessible from the outside of the vehicle, a controller connected to the actuator and the trigger switch and responsive to manual operation of the trigger switch to generate the trigger command, the controller receiving the radio code signal to compare the identification code with a preset authorized transmitter indicative code to output a control signal to the actuator for controlling the operation of the latter when the identification code matches the authorized transmitter indicative code, a second antenna arrangement, which is coupled with the controller for transmitting the command signal to the transmitter and receiving the radio code signal therethrough, comprises a first antenna loop forming a first magnetic field essentially parallel to a longitudinal axis of the vehicle, a second antenna loop forming a second magnetic field essentially transverse to the longitudinal axis of the vehicle, and means for mounting the second antenna within a space defined between an external surface and internal surface of the vehicle body construction in a location in the vicinity of the trigger switch.

BRIEF DESCRIPTION OF THE DRAWINGS

In the drawings:

FIGS. 5(A) and 5(B) are flowcharts of the operation of the transmitter of FIG. 3 and the controller of FIG. 4;

FIG. 6 is a section view;

FIG. 7 is an enlarged perspective and explanatory illustration of the preferred embodiment of an antenna arrangement of the invention;

FIG. 8 is a circuit diagram of the preferred embodiment of the antenna arrangement of FIG. 7;

DESCRIPTION OF THE PREFERRED EMBODIMENT

Before disclosing the detailed construction of the preferred embodiment of a radio code signal transmitter according to the present invention, the preferred embodiment of a keyless entry system and operation thereof will be described in order to facilitate better understanding of the present invention.

Figure 1:
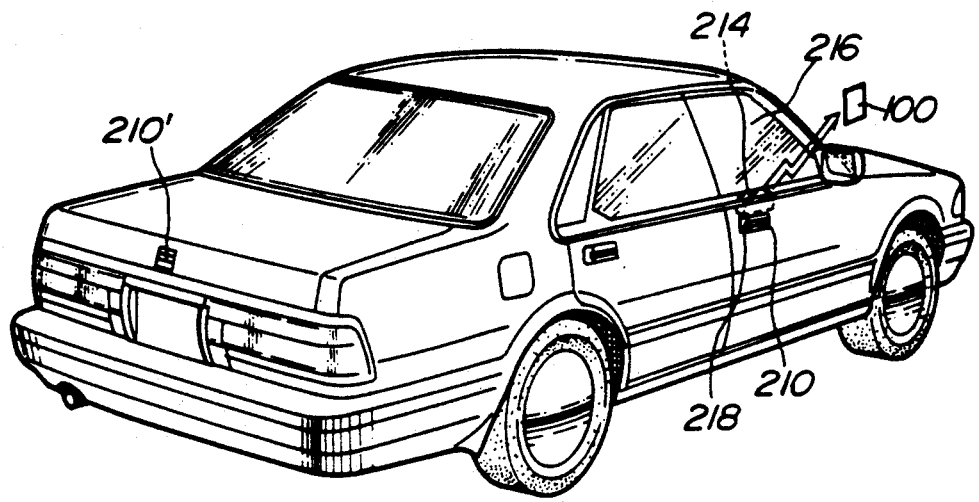
FIG. 1 is an external view of a vehicle, to which the preferred embodiment of the keyless entry system is employed.
Figure 2:
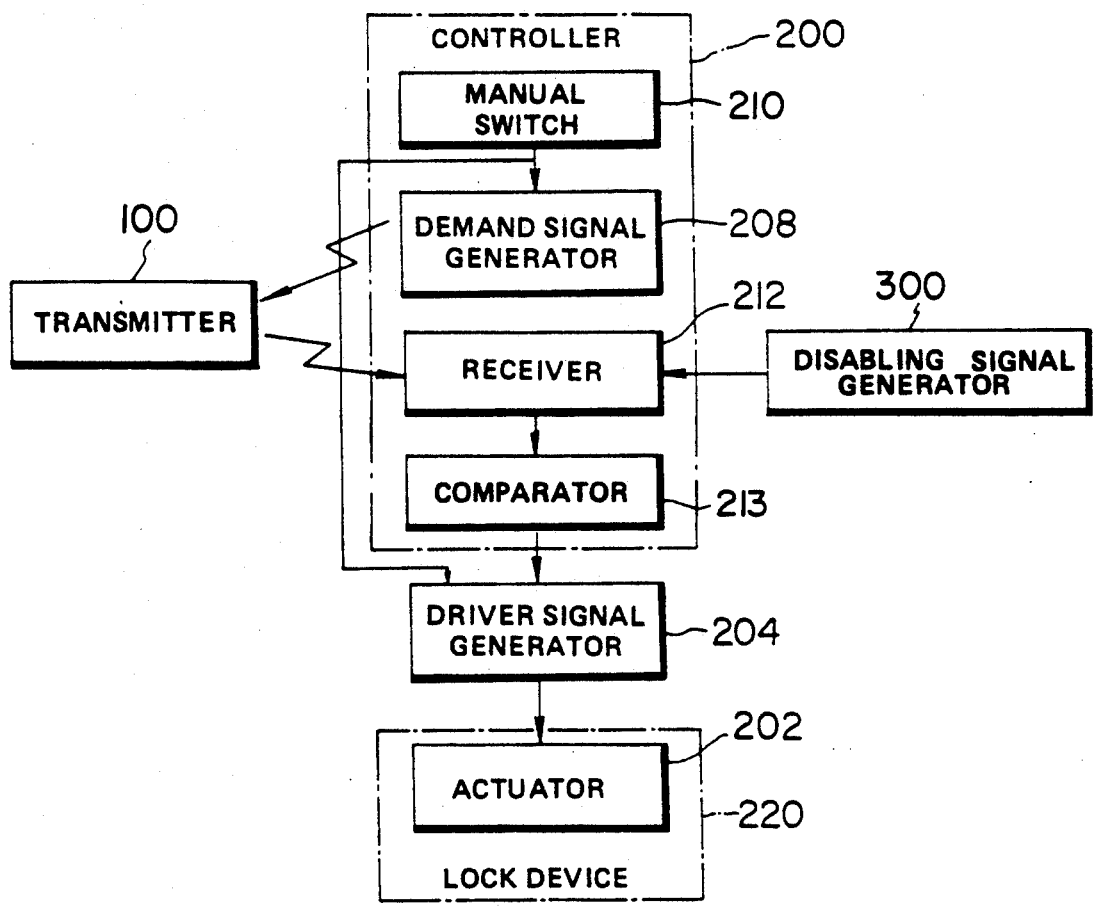
FIG. 2 is a schematic block diagram showing the general construction of the preferred embodiment of a keyless entry system, according to the invention.

Referring now to the drawings, particularly to FIG. 1, the preferred embodiment of the keyless entry system according to the invention, generally comprises a radio code signal transmitter 100 and a controller 200 (shown in FIG. 2). The radio code signal transmitter 100 is of a generally thin bank- or credit-card-like configuration and is equivalent in size to a bank or credit card. On the other hand, the controller 200 is mounted at an appropriate position within the passenger compartment of an automotive vehicle. Therefore, the radio code signal transmitter 100 is compact enough to be stored in a cloth pocket and carried conveniently. The preferred embodiment of the keyless entry system, according to the invention also has a trigger button 210 which is mounted on the external surface of the vehicle body and is manually operable for initiating keyless entry operation of the system. In the shown embodiment, the keyless entry system is designed for keyless operation of vehicular door lock device. As seen from FIG. 1, the trigger button 210 is installed in a outside door handle escutcheon 218.

Though the shown embodiment is directed to keyless operation for the door lock device, it may be possible to apply the keyless entry system of the invention for operating a trunk lid opener between trunk lid locking and unlocking positions. In this case, the trigger button may be provided in the vicinity of a trunk lid key cylinder which may be operable by means of a mechanical key, such as an ignition key.

As shown in FIGS. 1 and 2, the controller 200 is connected via a driver signal generator 204 to actuators 202 for vehicle devices such as a door lock device. The controller 200 is also connected to a disable signal generator 300 which can produce a disable signal to selectably disable the controller. The disable signal generator 300 responds to predetermined conditions by producing the disable signal.

In the shown first embodiment, the disable signal generator 300 detects when an ignition switch is in a position other than the OFF position. For instance, the disable signal generator 300 outputs the disable signal when the ignition switch is in the ACC position, wherein electric power is supplied to electrical accessories in the vehicle, or the IGN position, wherein electric power is supplied to an engine ignition system and to the electrical accessories, or the START position wherein electric power is applied to a starter motor (not shown).

The controller 200 includes a radio demand signal SD generator 208 which sends a radio demand signal SD to the radio code signal transmitter 100 to activate the latter. The radio demand signal SD generator 208 is connected to one or more manual switches 210 which are placed on the external surface of the vehicle so as to be accessible from outside the vehicle. The radio demand signal SD generator 208 produces the radio demand signal SD when one of the manual switches 210 is depressed.

Figure 3:
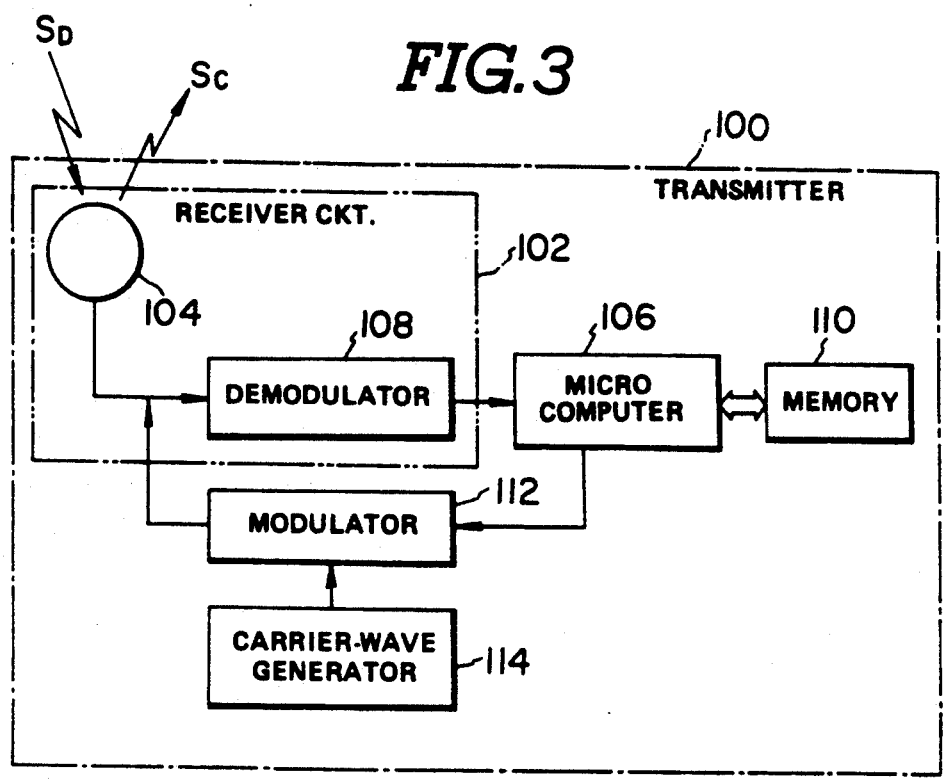
FIG. 3 is a block diagram of a radio code signal transmitter in the preferred embodiment of the keyless entry system of FIG. 1.

As shown in FIG. 3, the radio code signal transmitter 100 includes a receiver circuit 102 for receiving the radio demand signal SD from the controller. The radio code signal transmitter 100 becomes active when the receiving circuit 102 receives the radio demand signal SD to produce a radio code signal SC which is indicative of a preset specific code. The preset code of the portable radio code signal transmitter 100 differs from that of the radio demand signal SD generator 208 so that the controller 200 can recognize when the radio code signal transmitter 100 is responding.

The radio code signal transmitter 100 continuously transmits the radio code signal SC to the controller for as long as it remains active. The radio code signal SC is received by a receiver 212 in the controller 200. The controller 200 has a comparator 213 to compare the received code with a specific preset code. When the received code matches the code preset as compared in the comparator 213, the controller 200 sends a control signal SL to the driver circuit generator 204. The driver signal generator 204 in turn sends a drive signal to one of the actuators 202 corresponding to the manual switch 210 operated. The actuator 202 is activated by the driver signal from the driver signal generator 204 to operate the corresponding vehicle device.

It should be appreciated that, since the vehicle devices to be operated by the first embodiment of the keyless entry system are two-state locking devices for locking and unlocking vehicle doors, the trunk lid, the glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which is currently unlocked, that vehicle device is then locked.

The radio code signal transmitter 100 includes a transmitter/receiver antenna 104. In addition, a loop antenna 214 is built into an appropriate position of the vehicle, such as one of the windows 216 of the vehicle or in a side mirror. The loop antenna 214 transmits the radio demand signal SD to and receives the radio code signal SC from the radio code signal transmitter 100. As shown in FIG. 2, the manual switches 210 are mounted on an escutcheon 218 of an outside door handle for operation from outside the vehicle.

FIG. 3 shows the circuit structure of the radio code signal transmitter 100. A microprocessor 106 is connected to the antenna 104 via a demodulator 108 which demodulates the received radio demand signal SD. The microprocessor 106 includes a memory 110 storing the preset code. In response to the radio demand signal SD, the microprocessor 106 reads the preset code out to a modulator 112. The modulator 112 is, in turn, connected to a carrier-wave generator 114 to receive a carrier wave. The modulator 112 modulates the carrier-wave with the code-indicative signal from the microprocessor 106 to produce the final radio code signal SC.

In the preferred embodiment, the antenna 104 of the radio code signal transmitter 100 is built into the transmitter circuit board or on the surface of a transmitter housing (not shown). The casing is the size of a name card and thin enough to carry in a shirt pocket. The transmitter 100 uses a long-life, compact battery, such as a mercury battery, as a power source.

Figure 4:
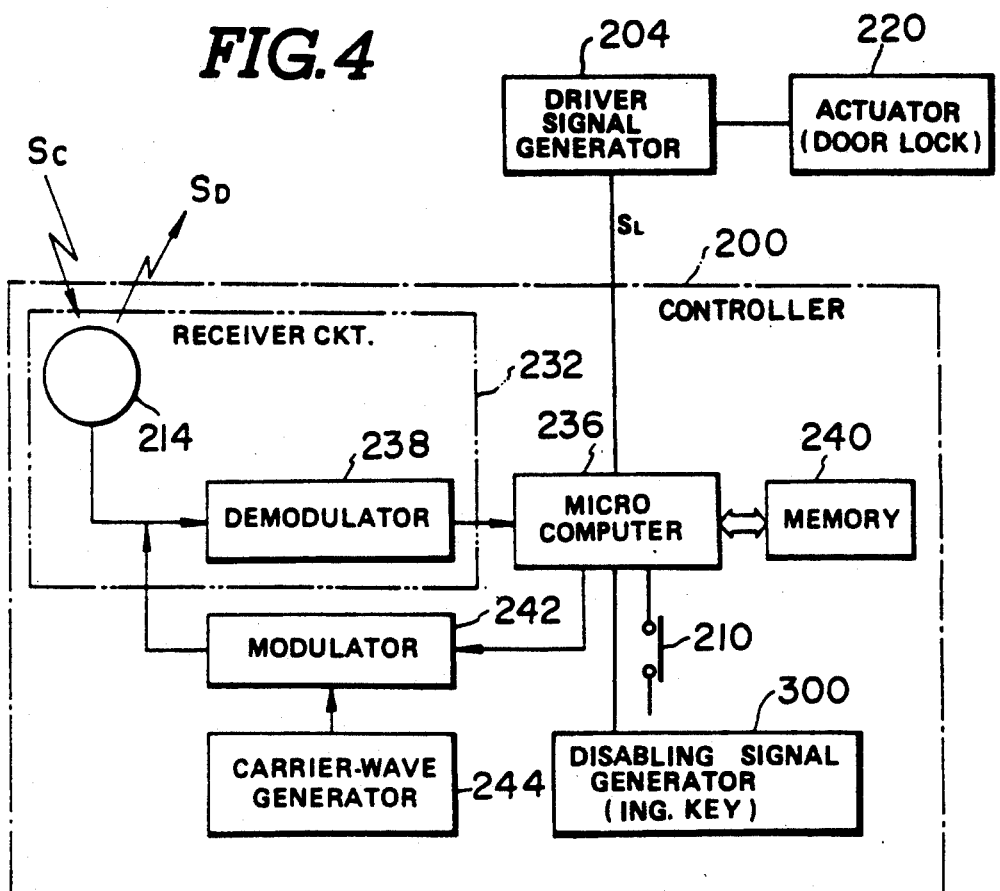
FIG. 4 is a block diagram of a controller in the preferred embodiment of the keyless entry system of FIG. 2.

FIG. 4 shows the practical circuit structure of the controller 200 which has been disclosed functionally with reference to FIG. 2. As seen from FIG. 4, the controller 200 generally comprises a microprocessor 236 which is connected to the antenna 214 through a demodulator 238, which together constitute a receiver circuit 232 receiving the radio code signal Sc from the radio code signal transmitter 100. Also, the microprocessor 236 is connected for output to the antenna 214 through a modulator 242. The modulator 242 is also connected to a carrier-wave generator 244 to receive therefrom a carrier wave of a predetermined frequency. The modulator 242 modulates the carrier wave in accordance with a demand indicative signal from the microprocessor and transmits the resulting radio demand signal through the antenna 214.

The microprocessor 236 has an internal or external memory 240 such as a programable ROM or the like. Preset codes, one of which corresponds to the demand for activating the radio code signal transmitter 100 and the other of which corresponds to the preset code in the radio code signal transmitter, are stored in the memory 240.

As set forth above, the microprocessor 236 is also connected to a disabling signal generator 300, such as the ignition switch. The microprocessor 236 is disabled in response to the disabling signal from the disabling signal generator when a predetermined disabling factor is detected. Unless disabled by the disabling signal, the microprocessor 236 receives the radio code signal from the radio code signal transmitter 100, compares the received code with the preset code in the memory 240, and outputs the control signal to a driver signal generator 204 for operating the actuator 220.

The operation of the aforementioned embodiment the keyless entry system set forth above will be described in more detail with reference to FIGS. 5(A) and 5(B). The microprocessor 106 of the radio code signal transmitter 100 repeatedly executes the first control program illustrated in FIG. 5(A). In the first control program, the microprocessor 106 checks for receipt of the radio demand signal SD from the controller at a step 1002. The step 1002 is repeated until the radio demand signal SD is received. In other words, the radio code signal transmitter 100 normally remains in a stand-by state, waiting to produce the radio code signal SC in response to the radio demand signal SD.

When the radio demand signal SD is detected at the step 1002, the preset code is read from the memory 110 at a step 1004. The microprocessor 106 then outputs the preset code-indicative signal to the modulator 112 which, in turn, outputs the radio code signal SC in step 1006. Control then returns to the stand-by step 1002.

It should be noted that the radio code signal SC is transmitted from the modulator to the controller 200 for a given period of time and terminates when the given period of time expires. The given period of time during which the radio code signal SC is transmitted is so chosen that the controller 200 can activate the actuator 202 designated by the operated manual switch 210 before expiration of that period. In addition, the preset code stored in the memory 110 is preferably a binary code, such as an 8-bit serial datum. This binary code rides on the carrier wave as modulated by the modulator to form the radio code signal SC.

FIG. 5(B) is flowchart for the controller 200. At the initial stage of the second control program of FIG. 5(B), the microprocessor 232 checks whether disabling signal $S_T$ is input or not at a step 2002. If the disabling signal $S_T$ is not detected when checked at the step 2002 control passes to steps 2003 and 2004, in which the modulator 242 is activated to send a radio demand signal SD to the radio code signal transmitter 100 to activate the latter. Thereafter, the controller 200 enters a second stand-by state, waiting for the radio code signal SC. Specifically, a step 2006 is repeated for a fixed period of time as a loop until the radio code signal SC is received. After the radio code signal SC is input via the antenna 214 and the demodulator 230, the received code in the radio code signal SC is read out at a step 2008. The preset code of the controller 200 is then read out from the memory 236, at a step 2010. The input code and the preset code read out in steps 2008 and 2010 are compared at a step 2012. If the codes match, a matching flag FM is set at the step 2012. The matching flag FM is checked at a step 2014. If the matching flag FM is not set, the program ends. On the other hand, if the matching flag FM is set when checked at the step 2014, then the control signal SL is sent to the driver signal generator at a step 2016.

In this embodiment as set forth above, since the radio code signal SC is output only when the demand signal SD is input from the controller, consumption of electric power of the battery in the transmitter is significantly reduced in comparison with a system which might employ constant transmission of the radio code signal SC. Thus, the life-time of the battery of the transmitter is prolonged even though electric power is constantly supplied to the microprocessor to hold it in stand-by. It should be appreciated that the electric power needed to power the microprocessor is substantially smaller than that consumed in transmitting the radio code signal SC. Therefore, constant power supply to the microprocessor will not significantly affect the life-time of the battery.

It should be also appreciated that the control signal $S_L$ serves to actuate the associated vehicle device to the desired position. For instance, when the vehicle device to be operated is the door lock device, the position of the door lock device is reversed between its locked and unlocked positions each time the control signal $S_L$ is generated. Therefore, in the step 2016, the control signal $S_L$ for reversing the door lock device position is output when the manual switch 210 associated with the door lock device is manually depressed.

In the keyless entry system set forth above, radio communication between the controller 200 and the radio code signal transmitter 100 is performed by electromagnetic induction caused between antenna 214 and 104 for transmitting and receiving the radio demand signal SD and the radio code signal SC. In order to assure radio communication, the distance between the antenna 104 of the radio code signal transmitter 100 and the antenna 214 of the controller 200 has to be within a predetermined radio communication range, e.g. one meter. When the user of the keyless entry system who has authorized radio code signal transmitter 100, operates the trigger button 210, the User must stand in the vicinity of the outside door handle escutcheon 218. Therefore, by providing the antenna 214 in the vicinity of the trigger button 210, the distance between the antenna 214 and the antenna 104 of the transmitter 100 can be held within the radio communication range.

In this view, the preferred embodiment of the keyless entry system installs the antenna 214 within a hollow space defined in a vehicular door 250, as shown in FIG. 1.

Further detail of the mounting structure and the practical construction of the antenna 214 are illustrated in FIGS. 6 to 8. As is well known, the vehicular door 250 is formed by a door outer panel 252 on which the outside door handle escutcheon 218 is installed, and a door inner panel 254 positioned in opposition with the door outer panel for defining therebetween a hollow space serving as a door window pane receptacle and for receiving therein a window regulator mechanism and a door lock device and so forth. The inside surface of the door inner panel 254 is covered by a door trim 256.

As clearly seen from FIGS. 6 and 7, the door inner panel 254 is bent at upper end portion toward the door outer panel 252 to define a slot through which a door window pane 258 extends. The bent upper portion forms a shoulder section 260. An antenna receptacle recess 262 is formed on the shoulder section 260. The position of the antenna receptacle recess 262 substantially corresponds to the position of the trigger button 210 so as to minimize the distance between the antennas 214 and 104.

Figure 9:
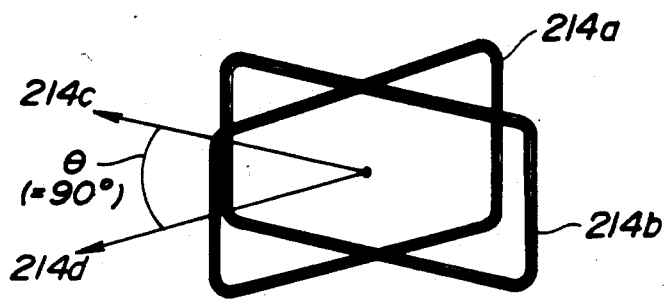
FIG. 9 is a diagram of the relationship between the polarities of a first antenna loop and a second antenna loop in the preferred embodiment of the antenna in FIG. 7.

As shown in FIG. 8, the antenna 214 to be mounted on the antenna receptacle recess 262 comprises a twin loop antenna including a first antenna loop 214a and a second antenna loop 214b. The axes of winding of the first and second antenna loops 214a and 214b are perpendicular to each other. With this arrangement, the antenna axes 214c and 214d of the first and second antenna loops 214a and 214b subtend an angle θ of approximately 90°, as illustrated in FIG. 9. Furthermore, the antenna loop 214a is wound around a ferromagnetic core 214e, such as a ferrite core.

Figure 10:
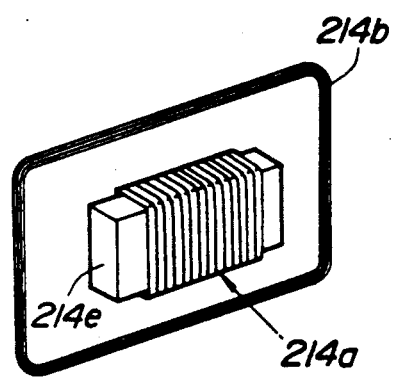
FIGS. 10 and 11 are diagrams of the antenna of FIG. 7, showing arrangement of the first and second antenna loops of the preferred embodiment of the antenna.
Figure 11:
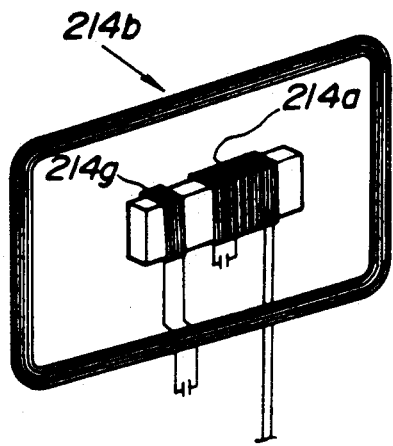
Figure 12:
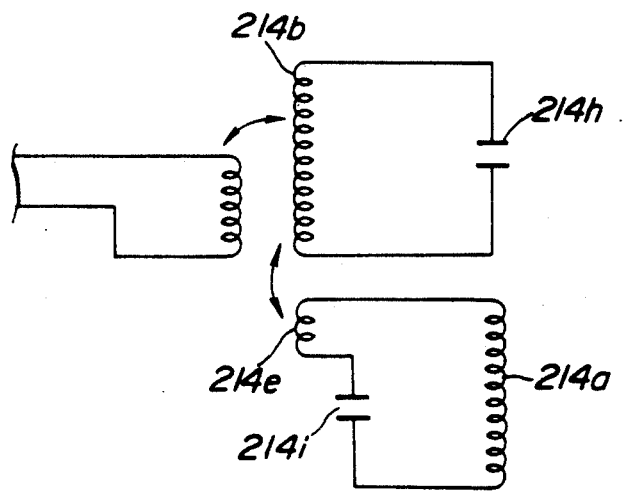
FIG. 12 is a schematic circuit diagram of the antenna circuit of the antenna in FIG. 9.
Figure 13:
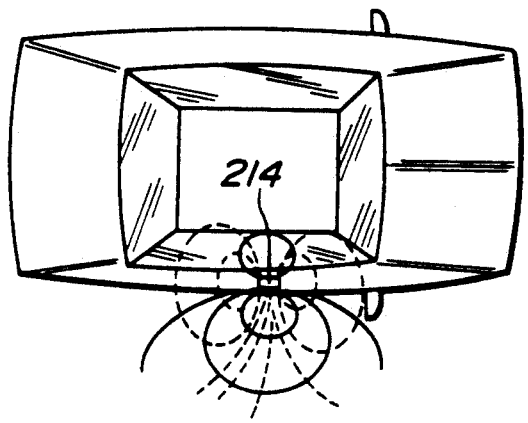
FIG. 13 is an illustration showing a magnetic field formed around the antenna of FIG. 7.

In the preferred construction, the ferromagnetic core 214e and the first antenna loop 214a may be mounted on a first support section of an antenna stay 214f. On the other hand, the second antenna loop 214b is mounted on a second support section which is integrally formed with the first support section. The antenna stay 214f has an extension to be attached on the peripheral surface of the door inner panel so as to be secured thereon by means of fastening screws 215. FIGS. 10 to 12 show an alternative embodiment of the antenna structure suitable to be employed for the preferred embodiment of the keyless entry system, according to the invention. In this alteration, another loop 214g is formed by winding lead wire around the ferromagnetic core 214e in a coaxial relationship with the first antenna loop 214a. Furthermore, the lead wires for connecting the antenna 214 to the microprocessor 236 are also wound around the ferromagnetic core 214e together with the first antenna loop 214a. The lead wires are coupled with the first antenna loop 214a by way of inductive coupling, as illustrated in FIG. 12. Also, the loop formed by the lead wire is coupled with the first antenna loop 214a by way of inductive coupling.

Capacitors 214h and 214i are respectively connected in series to the first antenna loop 214a and the loop of the lead wire. The capacitors 214h and 214i are coupled inductively to act as a capacitor unit.

In use, since the axes of the first and second antenna loops 214a and 214b are perpendicular to each other, the magnetic fields generated around the antenna 214 by respective loops 214a and 214b are offset by 90°. By providing 90°-offset magnetic fields around the door electromagnetic induction between the antenna 104 of the radio code signal transmitter 100 and the antenna 214 can be induced irrespective of the direction and/or orientation of the antenna 104 of the radio code signal transmitter. This ensures radio communication between the radio code signal transmitter 100 and the controller 200.

Since the first antenna loop 214a is formed around the ferromagnetic core 214e, a sufficiently strong magnetic field can be generated thereabout. The strength of the magnetic field around the first antenna loop 214a is substantially equivalent to that generated by the second antenna loop 214b. This allows the first antenna loop 214a to be compact enough to be disposed within the second antenna loop 214b.

Furthermore, since the antenna 214 is positioned at the position substantially corresponding to the position of the trigger switch, the possible maximum distance between the antennas 104 and 214 substantially correspond to the length of a user's arm. This assures radio communication between the transmitter and the controller. In addition, because the radio communication range can be made smaller, the power required for causing electromagnetic induction becomes smaller to save power consumption in the transmitter.

Figure 14:
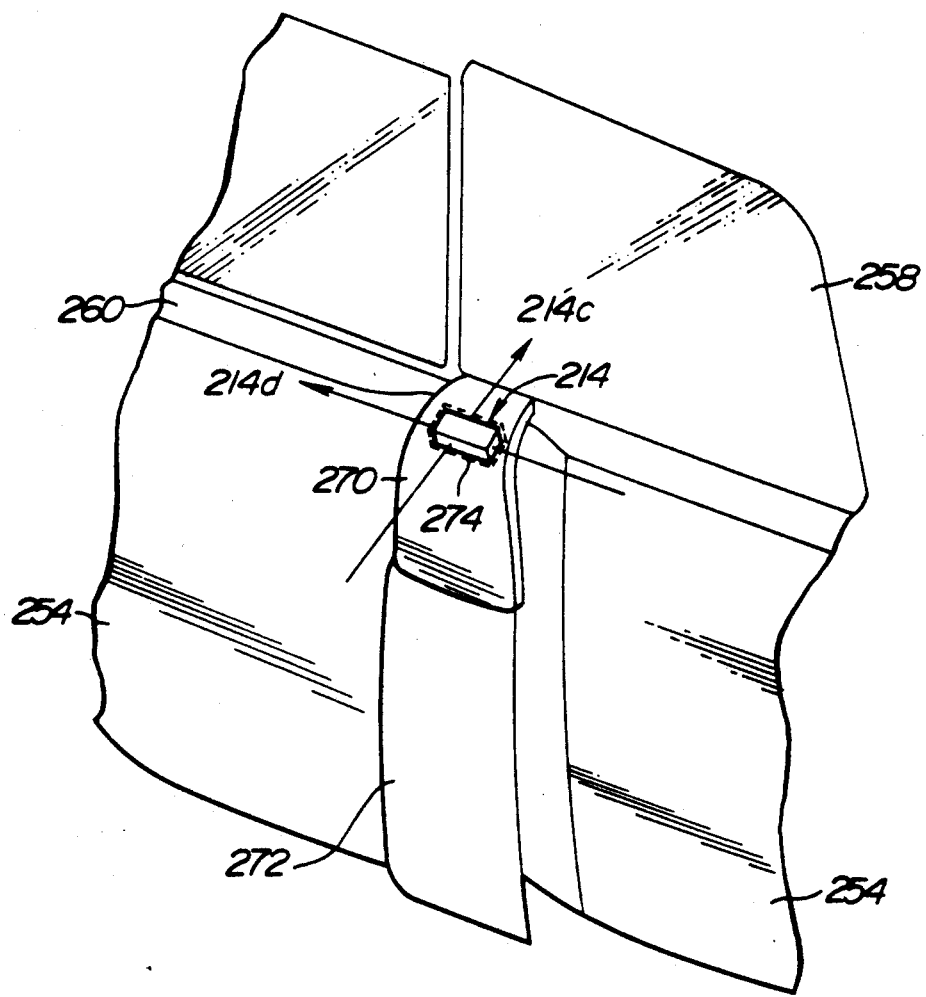
FIG. 14 is a perspective view of another structure of mounting the preferred embodiment of the antenna arrangement of the invention.

FIG. 14 shows a modification of the mounting structure of the antenna 214. In this modification, the antenna is mounted on the upper portion of a garnish 270 covering a center piller 272 of the vehicle. Preferably, the antenna receptacle recess 274 is formed on the inner periphery of the garnish 270 instead of the door inner panel 254. This construction may be particularly adaptable for a vehicle of center pillerless construction.

Even in this construction, since the outside door escutcheon to mount thereof the trigger button 210 is located in the vicinity of the center piller of the vehicle, substantially the same effect can be obtained.

As set forth, the invention fulfills all of the objects and advantages sought therefor.

What is claimed is:

1. A keyless entry system for operating a vehicular door lock between a first locking position and second unlocking position comprising:
   an electrically drivable actuator associated with said vehicular door lock for operating the latter between said first and second positions;
   a radio signal transmitter which is of a size equivalent to a credit-card, and being triggerable by a trigger command and generating a radio code signal containing a preset identification code, said radio signal transmitter having a first antenna;
   a manually operable trigger switch mounted on a vehicle body and exposed to the outside of the vehicle body so that it is accessible from the outside of the vehicle;
   a controller connected to said actuator and said trigger switch and responsive to manual operation of said trigger switch to generate said trigger command, said controller receiving said radio code signal to compare said identification code with a preset authorized transmitter indicative code to output a control signal to said actuator for controlling the operation of the latter when said identification code matches said authorized transmitter indicative code; and
   a second antenna coupled with said controller and designed for transmitting said command signal to said transmitter and receiving said radio code signal therethrough, said second antenna including a first antenna loop forming a first magnetic field essentially parallel to a longitudinal axis of said vehicle and a second antenna loop forming a second magnetic field essentially transverse to said longitudinal axis of the vehicle, and said second antenna being installed within a space defined between a door inner panel and a door trim, said first and second antenna loops in combination being oriented at an orientation corresponding to said trigger switch and at a distance from said trigger switch short enough for inductive communication with said first antenna.

2. A keyless entry system as set forth in claim 1, wherein said second antenna is so located as to establish a magnetic field on the outside of the vehicle body substantially centered at said trigger switch position.

3. A keyless entry system as set forth in claim 1, wherein said trigger switch is installed in the vicinity of an outside door handle.

4. A keyless entry system as set forth in claim 3, wherein said trigger switch is mounted on an outside door handle escutcheon.

5. A keyless entry system as set forth in claim 1, wherein said door inner panel is formed with an antenna receptacle recess to mount said second antenna thereon.

6. A keyless entry system as set forth in claim 5, wherein said antenna receptacle recess is formed at a shoulder portion of said door inner panel, at which said door inner panel is bent.

7. A keyless entry system as set forth in claim 1, wherein said second antenna is installed between a center piller and a center piller garnish.

8. A keyless entry system as set forth in claim 7, wherein said center piller garnish is formed with a second antenna receptacle recess on a surface opposing to said center piller.

9. A keyless entry system as set forth in claim 2, wherein said trigger switch is installed in the vicinity of an outside door handle.

10. A keyless entry system as set forth in claim 9, wherein said trigger switch is mounted on an outside door handle escutcheon.

11. A keyless entry system as set forth in claim 10, wherein said second antenna is oriented at a position substantially in alignment in lateral direction to said outside door handle escutcheon.

12. In a keyless entry system for operating a vehicular door lock device between a first door locking position and a second door unlocking position comprising an electrically drivable actuator associated with said vehicular door lock for operating the latter between said first and second positions, a radio signal transmitter which is of a size equivalent to a credit-card, and being triggerable by a trigger command and generating a radio code signal containing a preset identification code, said radio signal transmitter having a first antenna, a manually operable trigger switch mounted on a vehicle body and exposed to the outside of the vehicle body so that it is accessible from the outside of the vehicle, a controller connected to said actuator and said trigger switch and responsive to manual operation of said trigger switch to generate said trigger command, said controller receiving said radio code signal to compare said identification code with a preset authorized transmitter indicative code to output a control signal to said actuator for controlling the operation of the latter when said identification code matches said authorized transmitter indicative code, a second antenna arrangement, which is coupled with said controller for transmitting said command signal to said transmitter and receiving said radio code signal therethrough, comprising:

- a first antenna loop forming a first magnetic field essentially parallel to a longitudinal axis of said vehicle;
- a second antenna loop forming a second magnetic field essentially transverse to said longitudinal axis of the vehicle; and
- means for mounting said second antenna within a space defined between a door inner panel and a door trim, said first and second antenna loops in combination being oriented at an orientation corresponding to said trigger switch and at a distance from said trigger switch short enough for inductive communication with said first antenna.

13. An antenna arrangement as set forth in claim 12, wherein said first and second antenna loops forms said first and second magnetic fields with a phase shift of 90°.

14. An antenna arrangement as set forth in claim 13, wherein said second antenna is so located as to establish a magnetic field on the outside of the vehicle body substantially centered at said trigger switch position.

15. An antenna arrangement as set forth in claim 14 wherein said trigger switch is installed in the vicinity of an outside door handle.

16. An antenna arrangement as set forth in claim 15 wherein said trigger switch is mounted on an outside door handle escutcheon.

17. An antenna arrangement as set forth in claim 16, wherein said door inner panel is formed with an antenna receptacle recess to mount said second antenna thereon.

18. An antenna arrangement as set forth in claim 17, wherein said antenna receptacle recess is formed at a shoulder portion of said door inner panel, at which said door inner panel is bent.

19. An antenna arrangement as set forth in claim 13, wherein said second antenna is installed between a center piller and a center piller garnish.

20. An antenna arrangement as set forth in claim 19, wherein said center piller garnish is formed with a second antenna receptacle recess on a surface opposing to said center piller.

* * * * *